United States Patent [19]

Lemieux et al.

[11] 4,384,079

[45] May 17, 1983

[54] USE OF URETHANE CURED NITRILE ELASTOMER AS OXIDIZED FUEL RESISTANT VULCANIZATES

[75] Inventors: Marvin A. Lemieux, Southfield; Paul C. Killgoar, Jr., Livonia, both of Mich.

[73] Assignee: Ford Motor Company, Dearborn, Mich.

[21] Appl. No.: 310,585

[22] Filed: Oct. 13, 1981

[51] Int. Cl.$^3$ .............................................. C08F 8/30
[52] U.S. Cl. .................................. 525/329.3; 138/177
[58] Field of Search ............ 525/336, 346, 377, 329.3; 526/338

[56] References Cited

U.S. PATENT DOCUMENTS

| | | | |
|---|---|---|---|
| 3,338,862 | 8/1967 | Baker | 526/338 |
| 3,645,980 | 1/1975 | Baker et al. | |
| 3,870,620 | 3/1975 | Onishi | 526/338 |

OTHER PUBLICATIONS

Urethane Crosslinking of Natural Rubber by Baker et al., International Rubber Conference, May 1972.
"A New Crosslinking of Natural Rubber" by Baker et al., International Rubber Conference, May 1971.

*Primary Examiner*—Paul R. Michl
*Attorney, Agent, or Firm*—Lorraine S. Melotik; Roger L. May

[57] ABSTRACT

This invention relates to the use of particular urethane or urethane/sulfur cured acrylonitrile-butadiene elastomers in systems wherein a vulcanizate component with resistance to oxidized (sour) hydrocarbon fuel is desired, that is in systems wherein a vulcanizate functions in contact with hydrocarbon fuel having oxidation products therein. The vulcanizate composition consists essentially of the reaction produces of (i) 100 parts by weight of an acrylonitrile-butadiene copolymer and (ii) a curative comprising 1–10 parts by weight of a urethane curing agent, wherein the urethane curing agent is the reaction product of a nitrosophenol and a diisocyanate. The curative may additionally comprise sulfur.

5 Claims, 9 Drawing Figures

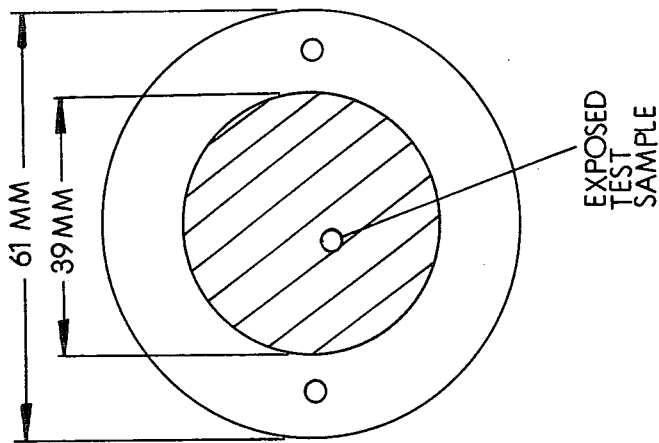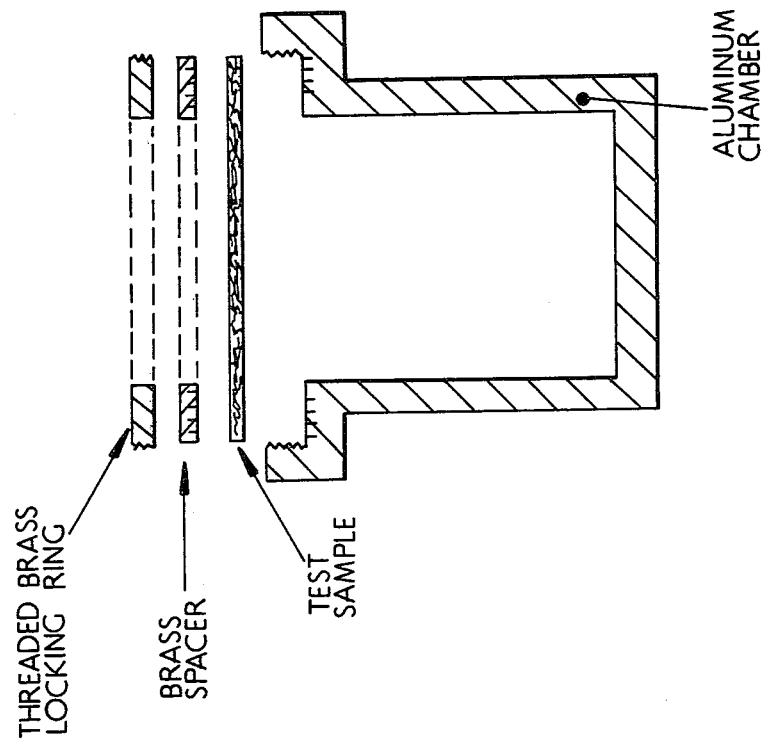
FIG. 8

USE OF URETHANE CURED NITRILE ELASTOMER AS OXIDIZED FUEL RESISTANT VULCANIZATES

This invention relates to the particular use of urethane or urethane/sulfur cured acrylonitrile-butadiene elastomers in systems wherein a vulcanizate component with resistance to oxidized (sour) hydrocarbon fuel is desired, i.e., in systems wherein a vulcanizate functions in contact with hydrocarbon fuel having oxidation products therein. This invention also relates to an article adapted for use in a sour hydrocarbon fuel environment and comprising this cured acrylonitrile-butadiene vulcanizate. Still further this invention is directed to a fuel system adapted to be exposed to sour hydrocarbon fuel comprising an article of desired configuration useful in the system consisting essentially of a urethane or urethane/sulfur cured acrylonitrile-butadiene vulcanizate.

BACKGROUND OF THE INVENTION

1. Field of the Invention

Fuel injection systems incorporating fuel recirculation may require increased maintenance as a result of degradation of rubber stock, e.g., hoses, which are contacted by the fuel. This problem has been attributed to an attack on the rubber elastomer by oxidation products present in the fuel, which attack results in a loss of physical properties and ultimately a failure of the vulcanizate. This problem is aggravated by the fact that unlike in the case of conventional fuel systems, fuel is delivered to the engine under pressure (0.2–0.3 MPa) in fuel injection systems.

While sour fuel contains hydroperoxides which are the result of oxidation of the fuel, these peroxides themselves appear to have little affect on the durability of the rubber stock. However, in the presence of metal ions, like copper, hydroperoxides can catalytically decompose into free radicals, which then can attack the elastomer. Metal ions present in the fuel not only catalyze the formation of the radicals but also promote the initial formation of the hydroperoxides in the fuel. Although trace amounts of metals, such as copper, may be present naturally in the fuel, the use of the fuel injection system increases the metal ion concentration in the fuel in several ways. First, since in a fuel injection system the fuel pump is submerged in the fuel tank and has a copper commutator which is cooled by the fuel passing over it, copper ions and metal may be added to the fuel through frictional wear and electrical arcing. Second, since in this type of system, a majority of the fuel is recirculated to the fuel tank, unlike conventional carburetor systems, metal ions such as copper can build up in the fuel tank. The increased presence of these metals in the fuel accelerates the oxidation whereby hydroperoxides are formed and subsequently converted to free radicals.

The effect the free radical has on elastomers varies. In the case of commonly used epichlorohydrin elastomers, for example, the compound softens due to chain scissioning. Nitrile elastomers (NBR), on the other hand, harden in the presence of sour fuel. In NBR this is attributed to an increase in the number of crosslinks. In both epichlorohydrin and NBR, the free radical attacks reactive sites on the polymer backbone.

We have now found that a particular urethane cured nitrile elastomer vulcanizate possesses excellent resistance to sour fuel degradation, making it most suitable for use in fuel systems wherein a vulcanizate with resistance to sour fuel degradation is desired.

2. Description of the Prior Art

Baker et al. in U.S. Pat. No. 3,645,980 teach a method of crosslinking natural or synthetic unsaturated rubber which comprises a urethane cure system much like that of this invention. The vulcanizate so produced is taught to be virtually reversion resistant, i.e., thermally stable and resistant to oxidation, when compared to conventionally sulfur cured vulcanizates. In their subsequent paper "Urethane Crosslinking of Natural Rubber", International Rubber Conference, P. G2 through G2-8 (1972), Baker et al. emphasize that the usefulness of this urethane cure system is directed primarily to developing natural rubber vulcanizates which are capable of long service times at elevated temperatures. Self admittedly, Baker et al did little work on synthetic rubber, such as the nitrile rubber of the subject invention, teaching that although the urethane reagents will cure the synthetic rubbers and give excellent reversion resistance, the sulfur-cured synthetic rubbers already had adequate reversion resistant for the applications in which they are employed, thereby making the urethane cure less useful than in the case of natural rubber.

We have now found, in contrast to the suggestion in Baker et al, that the thermal and oxidative resistance of urethane cured nitrile vulcanizate at elevated temperatures above 140° C., are in fact, inferior to those of sulfur cured nitrile vulcanizates. Based on knowledge of the similarity of mechanism involved (oxidation) in such high temperature degradation and degradation in the presence of sour fuel, one skilled in the art would have expected the urethane cured nitrile vulcanizate to exhibit poor sour fuel resistance. However, quite unexpectedly, it has been found that such urethane cured nitrile vulcanizates do demonstrate excellent resistance to sour fuel, thus making them an excellent selection for use in fuel system environments which may be exposed to sour fuel.

It is an object of this invention to provide an article adapted for use in sour fuel environment comprising a vulcanizate cured by urethane or urethane/sulfur and exhibiting resistance to sour fuel degradation.

BRIEF DESCRIPTION OF THE INVENTION

This invention relates to the use of urethane or urethane/sulfur cured nitrile elastomer compositions in systems wherein the vulcanizate comes in contact with sour hydrocarbon fuel. The use of this urethane cured nitrile elastomer comprises forming an article of desired configuration useful in the system of a vulcanizate composition which consists essentially of the reaction product of (i) 100 parts by weight of an acrylonitrile-butadiene copolymer and (ii) a curative comprising 1–10 parts by weight of a urethane curing agent, wherein the urethane curing agent is the reaction product of nitrosophenol and a diisocyanate, and placing the formed article in the system wherein the article is contacted by sour hydrocarbon fuel at least part of the time the system is in operation. The curative may additionally comprise sulfur.

The invention further relates to an article adapted for use in a sour hydrocarbon fuel environment and comprising a vulcanizate, the composition of which consists essentially of the reaction product of (i) 100 parts by weight of an acrylonitrile-butadiene copolymer and (ii) a curative comprising 1–10 parts by weight of a urethane curing agent, wherein the urethane curing agent is the reaction product of a nitrosophenol and a diisocyanate. The curative may additionally comprise sulfur.

Still further, the invention relates to a fuel system adapted to be exposed to sour hydrocarbon fuel comprising an article of desired configuration useful in the system wherein the composition of the article consists essentially of the reaction product of (i) 100 parts by weight of an acrylonitrile-butadiene copolymer and (ii) a curative agent comprising 1-10 parts by weight of a urethane curing agent, wherein the urethane curing agent is a reaction product of a nitrosophenol and a diisocyanate. The curative may additionally comprise sulfur. In this invention, the acrylonitrile-butadiene copolymer preferably comprises about 25 to about 50 mole percent of acrylonitrile.

BRIEF DESCRIPTION OF THE DRAWINGS

FIG. 8 illustrates the apparatus used for gasoline permeability tests.

DETAILED DESCRIPTION OF THE INVENTION

This invention relates to the use of urethane or urethane/sulfur cured nitrile elastomer materials in hydrocarbon fuel systems wherein elastomer vulcanizate having sour (oxidized) fuel resistance is desired. The optimal vulcanizate composition, its cure, and the vulcanizate composition sour fuel resistance relationship will be discussed hereinafter in greater detail.

Figure 1:
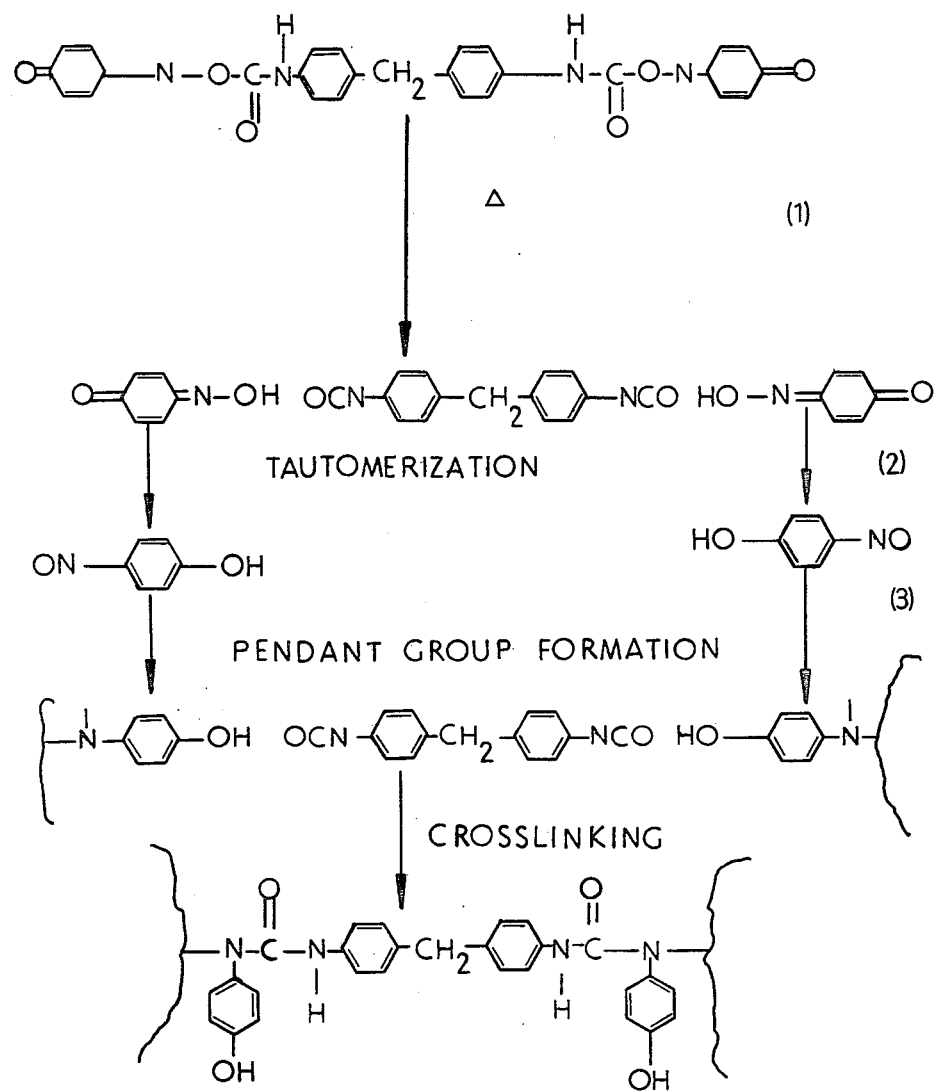
FIG. 1 illustrates schematically the urethane cure mechanism (the urethane being the reaction product of a nitrosophenol and diisocyanate).

The vulcanizate of this invention is the reaction product of (i) 100 parts by weight of an acrylonitrile-butadiene copolymer and (ii) a curative agent, comprising 1-10 parts by weight of a urethane curing agent, wherein the urethane curing agent is the reaction product of nitrosophenol and a diisocyanate. A schematic representation of the urethane cure mechanism is shown in FIG. 1. It should be noted that in the final step, the diisocyanate reacts predominately at the amine functionality leaving a phenolic group at the crosslink site. This phenolic group is very similar to typical phenolic antioxidants. Preferably, the nitrile vulcanizate of the subject invention are cured with a mixed urethane/sulfur curative system, therein the ratio of urethane to sulfur is between about 10:90 and 90:10, 50:50 being more preferred and 80:20 being most preferred.

NITRILE ELASTOMERS

Nitrile elastomeric polymers suitable for use in this invention are commercially available in various Mooney ranges, generally from 25 ML to 110 ML. The choice of the particular Mooney viscosity nitrile is only dependent on the particular type of process used to manufacture the vulcanizate component, such processess including extrusion, compression and transfer molding. The relative sour hydrocarbon fuel resistance of the various vulcanizates is not related to its Mooney viscosity, i.e., the Mooney viscosity has no effect beyond processing in our invention.

Figure 2:
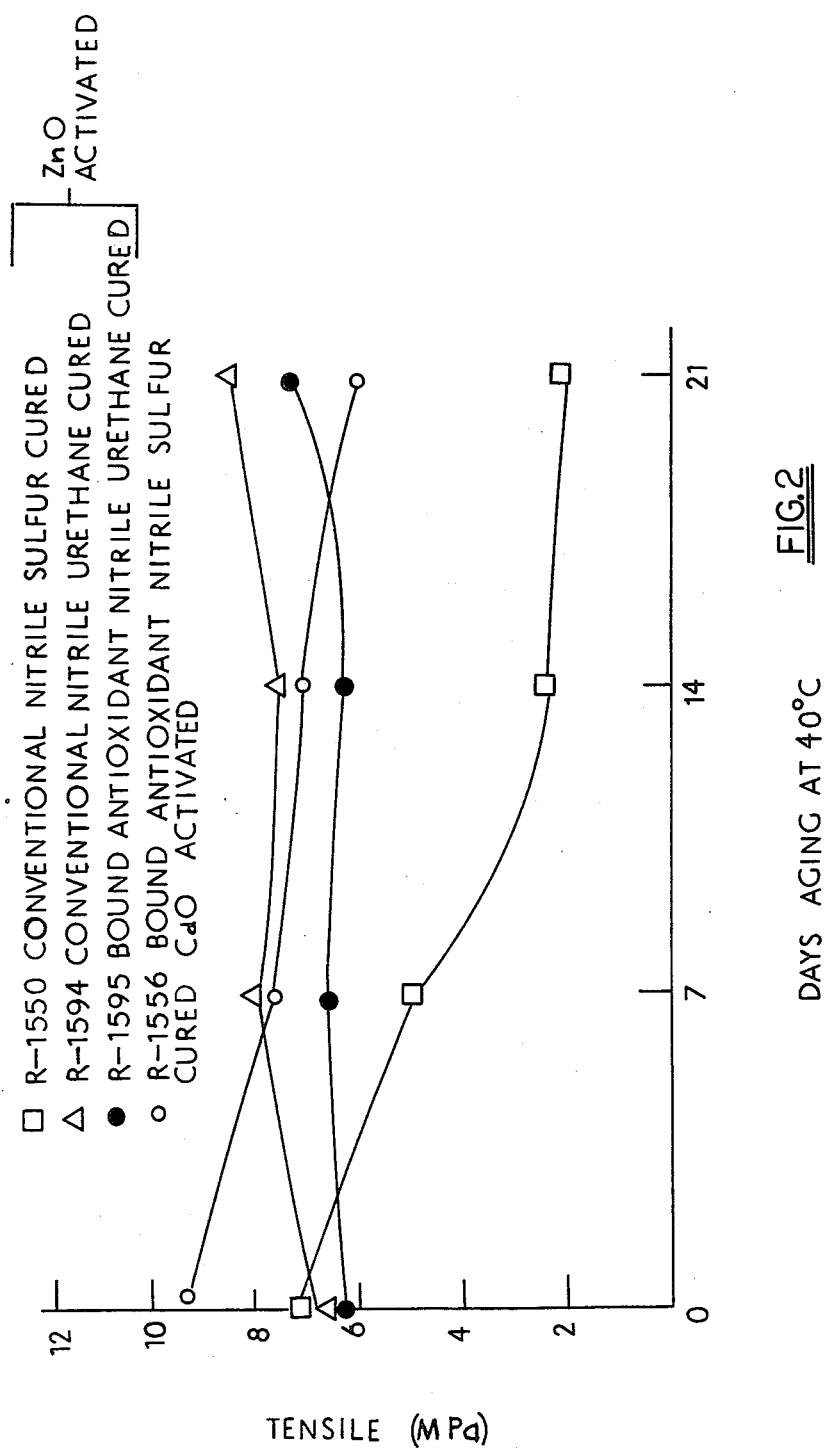
FIG. 2 graphically illustrates a comparison of the tensile strength after sour fuel aging of two sulfur cured Acrylonitrile-Butadiene Rubber's (NBR's) and two urethane cured NBR's.
Figure 3:
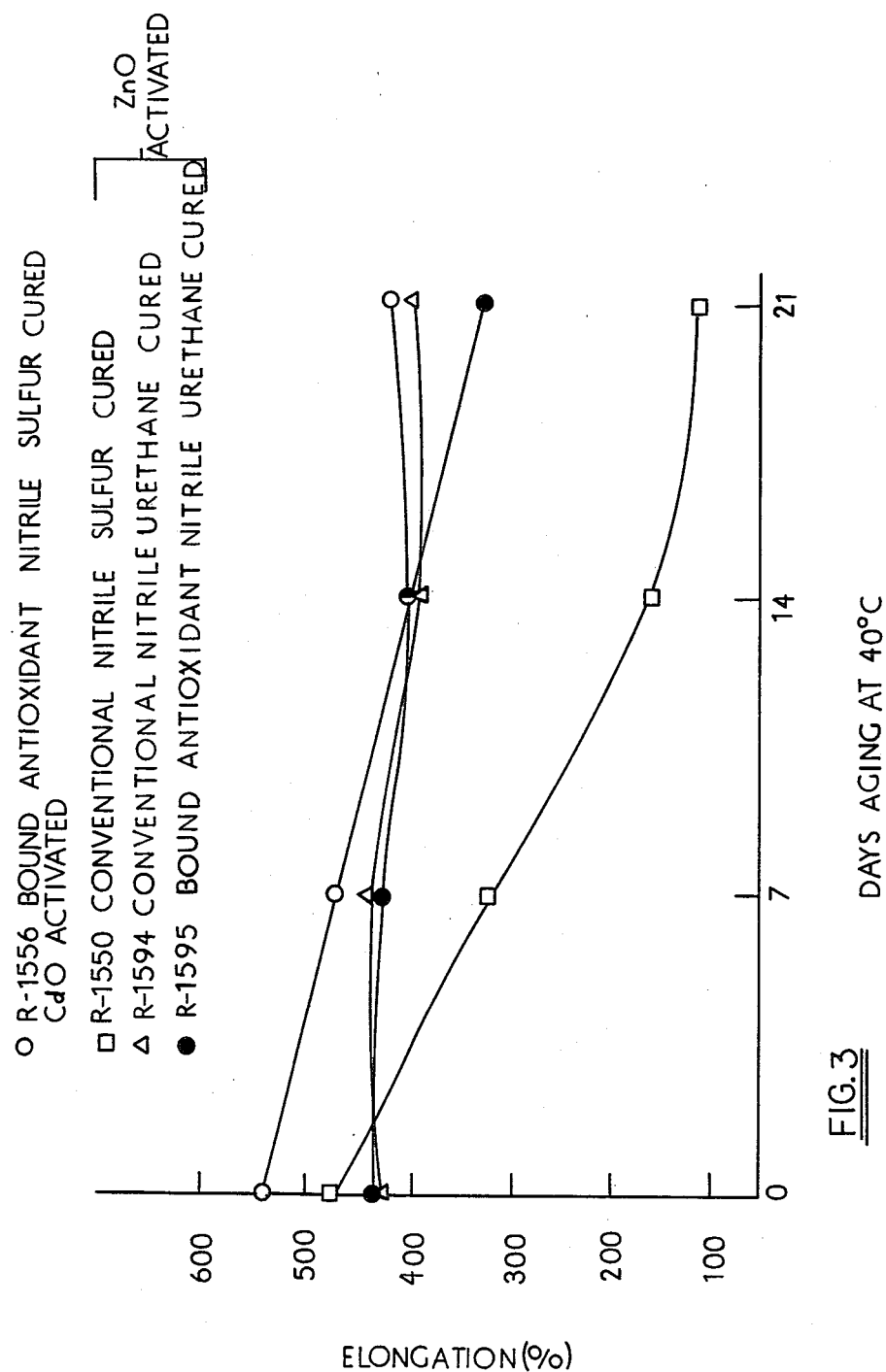
FIG. 3 graphically illustrates a comparison of the elongation at break after sour gasoline aging for the same compounds of FIG. 2.
Figure 4:
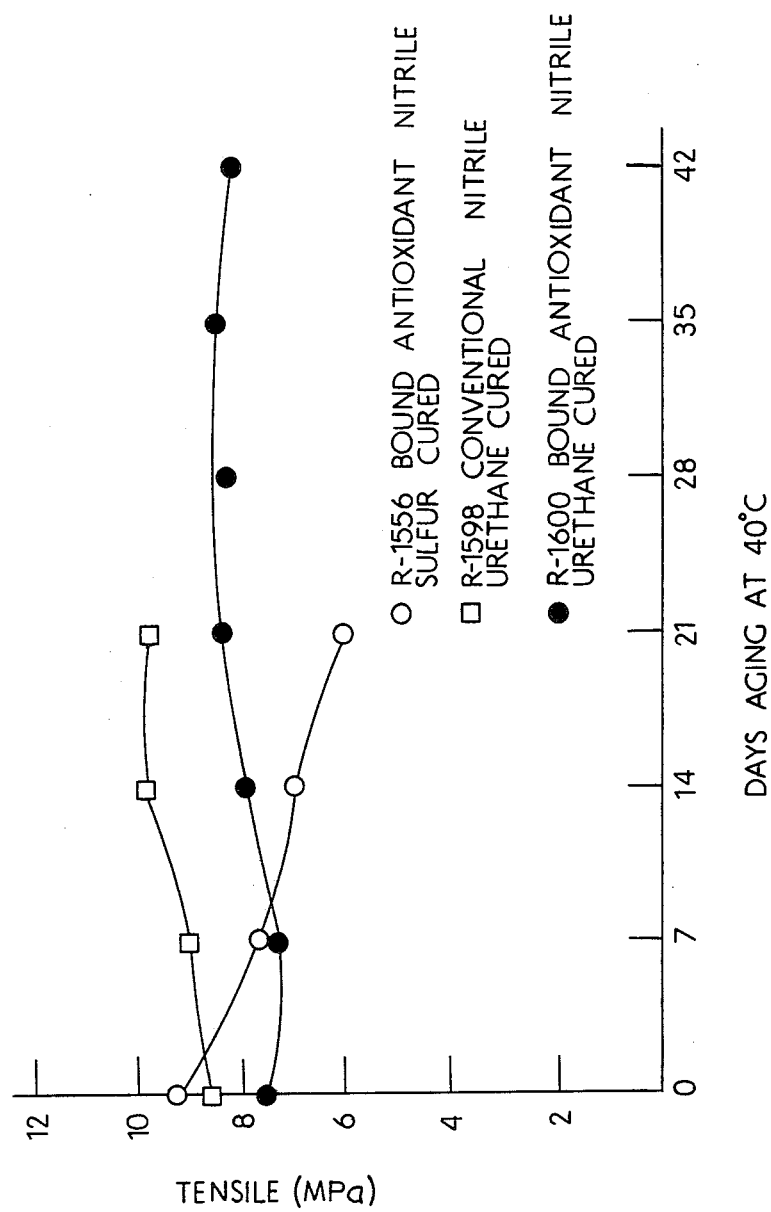
FIG. 4 graphically illustrates a comparison of the tensile strength after sour gasoline aging of a sulfur cured NBR and two urethane cured NBR's.

Nitrile elastomer compositions useful in this invention include conventional nitriles and bound antioxidant nitriles. The latter, in addition to consisting of the conventional acrylonitrile and butadiene monomers, have a third monomer, an antioxidant, polymerized into the backbone. One such antioxidant is N-(4-anilinophenyl) methacrylamide. Suitable commercially available nitrile elastomers include bound antioxidant Chemigum HR 765 (28% ACN) and Chemigum HR 365 (39% ACN), supplied by Goodyear Tire and Rubber Company and conventional (no antioxidant) Krynac 38.50 (38% ACN) supplied by Polysar Limited of Canada. However, it has been found that with respect to sour fuel resistance, the urethane cured conventional compound with no antioxidant behaves essentially the same as a urethane cured compound with added antioxidant, as is shown in FIGS. 2-4. From the results obtained, it can be seen that the addition of the bound antioxidant to the nitrile elastomer has little effect on the sour fuel resistance of the vulcanizate and therefore is not necessary to improve the sour fuel resistance.

Figure 5:
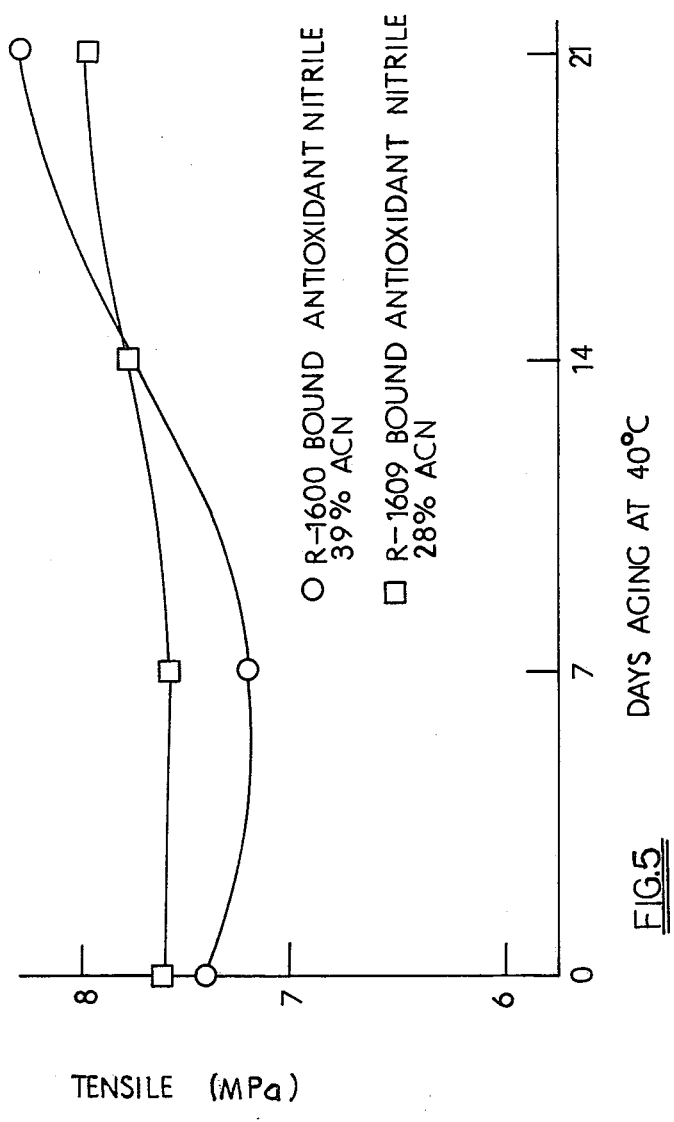
FIG. 5 graphically illustrates the effect of the acrylonitrile (ACN) content of urethane cured NBR's on tensile strength after sour gasoline aging.
Figure 6:
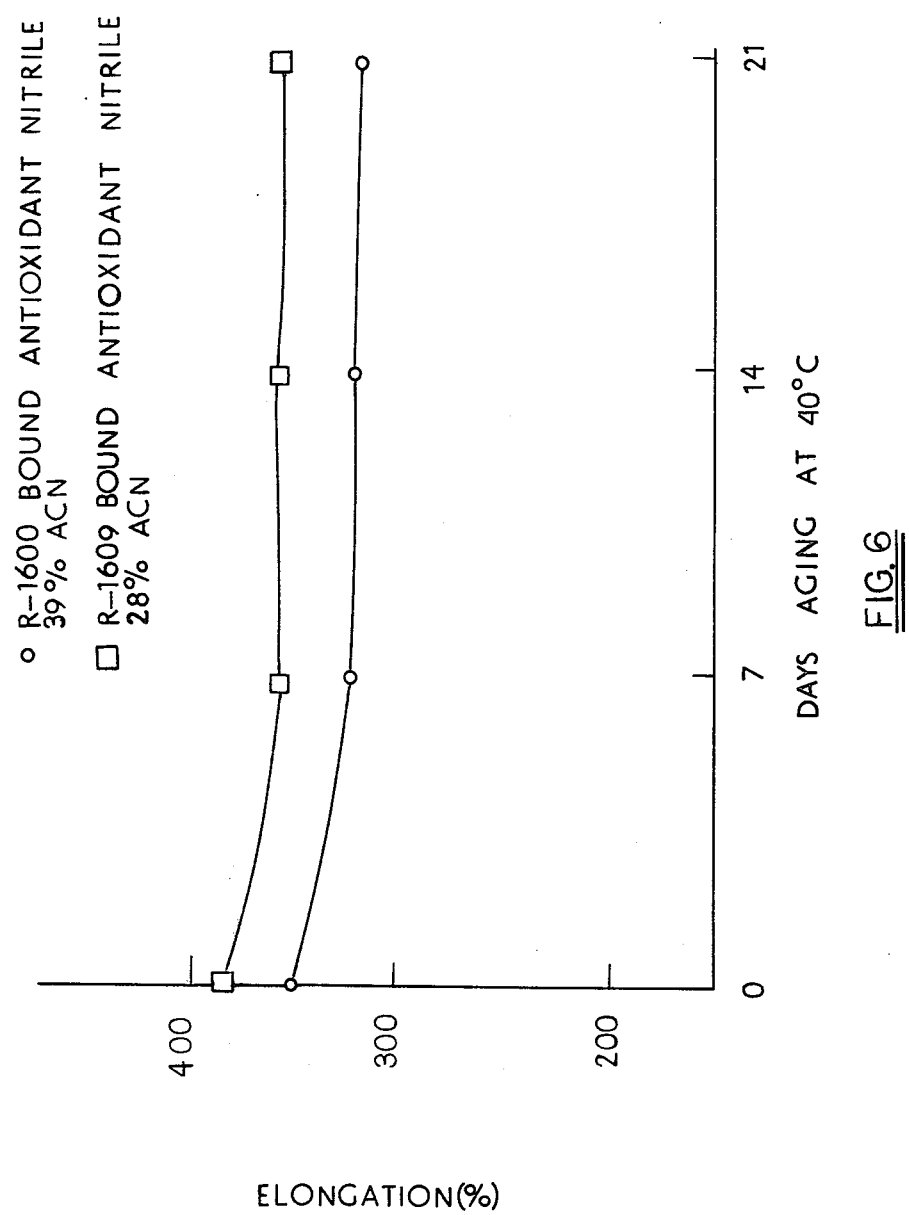
FIG. 6 graphically illustrates the effect of acrylonitrile content of urethane cured NBR's on elongation at break after sour gasoline aging.
Figure 7:
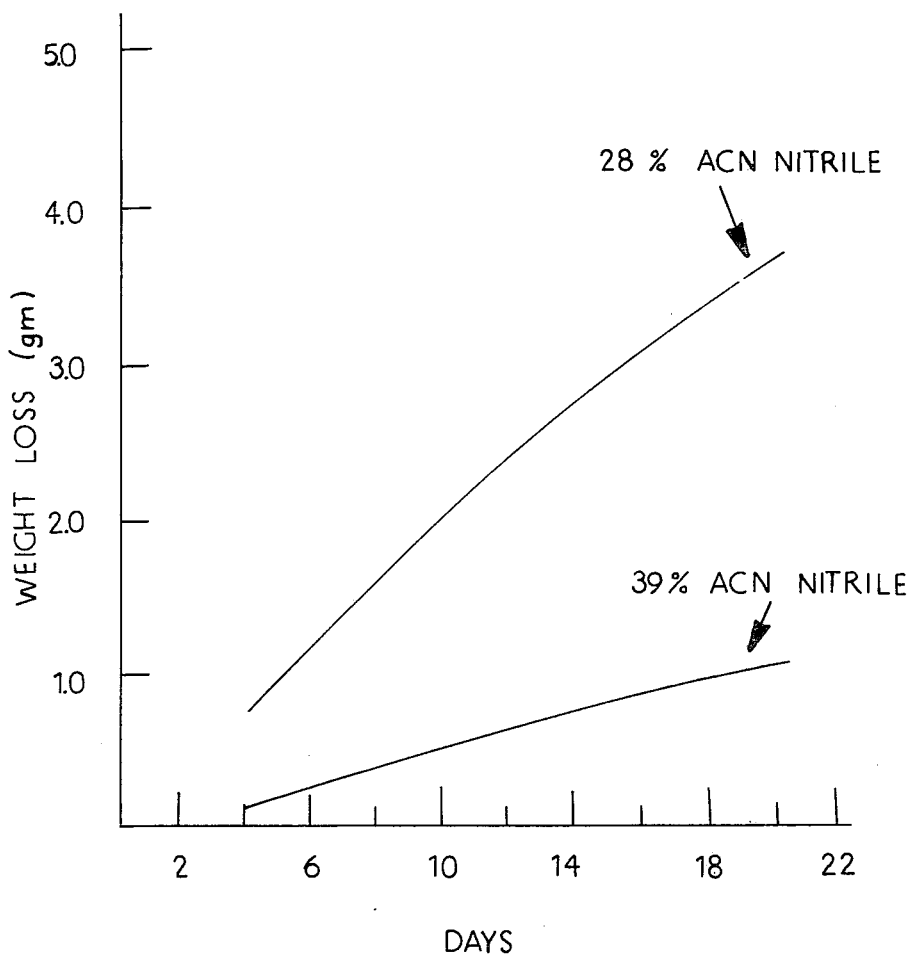
FIG. 7 graphically illustrates the effect of various acrylonitrile contents of the urethane cured NBR on the gasoline permeability.

While it has been determined that the ACN content of the polymer has no significant effect on sour gasoline resistance of urethane cured nitriles (FIGS. 5-6), the ACN content does appreciably affect fuel permeability through the elastomer. Fuel permeability decreases with increasing acrylonitrile (ACN) content. The permeability of two urethane cured bound antioxidant nitriles with ACN levels of 28% and 39% are compared in FIG. 7. The permeability of the 39% ACN was found to be 22 grams per $m^2/24h$. Permeability of 28% ACN nitrile was over three times greater at $75g/m^2/24h$. (This effect of ACN content is in agreement with published results for sulfur cured nitriles, and indicates that the urethane cure does nothing to affect permeability). However, while fuel permeability decreases with increasing ACN content, the low temperature flexibility of the elastomer is poorer. Thus, when choosing a NBR elastomer for a particular application, as for example, a fuel hose, the ACN content must be chosen with a balance of properties in mind.

Commercially available acrylonitrile-butadiene copolymer has an ACN content of about 20-50 mole percent of the copolymer. An ACN content of 25-40 mole percent is particularly suitable for some of the elastomer components taught in this application, particularly fuel hoses. However, the ACN content of the elastomers useful in this invention is not meant to be limited to this range. The particular use to which the vulcanizate will be put in the system and the properties therein desired will determine the optimal ACN content.

CURATIVE

The curative useful in this invention comprises either a urethane or a urethane/sulfur curing system. The urethane is the reaction product of a nitrosophenol and a diisocyanate.

A specific example of this type of blocked diisocyanate is a urethane product of a 2,4-toluene diisocyanate dimer and 4-nitroso-2-6,xylenol. Commercially available curing agents comprising a product of this type are Novor 913, 920 and 924 available from Durham Chemicals Ltd., Britley, Co., Durham, England.

Further examples of suitable urethane curatives appears in U.S. Pat. Nos. 3,904,592; 3,882,089; 3,775,441; 3,645,980; as well as in Baker, C. S. L. et al., "Urethane Crosslinking of Natural Rubber", International Rubber Conference, p. G2 through G2-8 (1972). The urethane (diisocyanates) taught by Baker et al therein are hereby expressly incorporated by reference as suitable for use in the subject invention.

Especially preferred curatives, however, for the sour gasoline resistant elastomeric articles of this invention comprise a curing system which is a combination of sulfur and urethane (blocked isocyanate). Such a curing system combination of sulfur and blocked isocyanate is illustrated in U.S. Ser. No. 796,114, filed May 11, 1977 in the name of Marano, (now abandoned) and is hereby herein expressly incorporated by reference. Although Morano directs his cure to natural rubber, this cure system is also suitable for curing the nitrile elastomer of the subject invention. In the combined isocyanate or blocked isocyanate and sulfur systems of U.S. Ser. No. 796,114, the sulfur is used at rubber soluble levels. Additionally, the sulfur accelerator is a catalyst for the urethane.

A preferred block isocyanate combination comprises (per 100 parts of elastomer) combinations of isocyanate or blocked isocyanate and sulfur used such as follows in Table A.

TABLE A

|  | NOVOR 924 | TMTM[1] | Sulfur | S[2] |
|---|---|---|---|---|
| 90/10 | 9.6 | 2.8 | 0.4 | 0.08 |
| 80/20 | 8.4 | 2.6 | 0.8 | 0.16 |
| 70/30 | 7.6 | 2.4 | 1.2 | 0.24 |
| 60/40 | 6.4 | 2.2 | 1.6 | 0.32 |
| 50/50 | 5.4 | 2.0 | 2.0 | 0.40 |

[1]Tetramethyl thiuram monosulfide accelerator
[2]Sulfenamide accelerator such as N—t-butyl-2-benzothiazolesulfenamide The urethane/sulfur curative system employed in this invention may comprise a ratio of urethane/sulfur curing agents of between about 1:9 and 9:1. However, preferably the curative system ratio is greater than about 1:1, 7:3 being more preferred and 4:1 being most preferred. As can be seen from the Examples, the compound which is 80/20 urethane/sulfur cured (R1601) gives the best sour fuel properties.

The nitrile elastomeric compositions used in this invention may also comprise organic or inorganic particulates such as carbon blacks, zinc oxide, fine particle calcium carbonate, silicas and silicates.

These elastomer compositions will accept all normal carbon black fillers characterized by particle sizes in the range of 20-35 millimicrons and structure, as measured by dibutylpthalate absorption, of 30 to 120. In this invention, the most preferred carbon blacks are the thermal blacks (particle size in the range of 250-350 millimicrons).

Silica has the advantage of improving the heat resistance and permeability of the fuel hose stocks. It does however also increase the compression set of the material. Therefore, a blend of silica and carbon black is preferred over either filler alone.

The elastomeric vulcanizate of the invention may desirably also include still other ingredients. Examples of such ingredients are antioxidants (e.g., polymerized quinolines, hindered amines, phenols), desiccants (e.g., calcium oxide), process oils, cure inhibitors or modifiers and the like known in the art.

Additionally, while the work of this invention has been directed to fuel systems in automobiles employing gasoline, it should be apparent to one skilled in the art that the subject invention would also suitably include any fuel system employing sour hydrocarbon fuel, e.g., jet fuel systems.

The following examples are presented by way of description of the process of the invention and to set forth the best mode contemplated by the inventors, but are not to be construed as limiting.

EXAMPLES

Elastomeric compositions were prepared as indicated in the following Table B. (Composition formulations are given in parts by weight.)

TABLE B

|  | R-1597 | R-1656 | R-1655 | R-1601 |
|---|---|---|---|---|
| Krynac 38.50 (conventional nitrile) | 100 | 100 | 100 | 100 |
| N-990 (carbon black) | 30 | 30 | 30 | 30 |
| Hi Sil 215 (Hydrated silica) | 80 | 80 | 80 | 80 |
| Zinc Oxide | 5 | 5 | 5 | 5 |
| Stearic acid | 0.5 | 0.5 | 0.5 | 0.5 |
| Maglite D Bar (MgO dispersion) | 10 | 10 | 10 | 10 |
| Naugard 445 (amine antioxidant) | 2 | — | — | — |
| Struktol WB 212 (process aid) | 3 | 3 | 3 | 3 |
| Struktol WB 300 (polyester plasticizer) | 25 | 25 | 25 | 25 |
| Sulfur (spider) | 0.4 | — | — | — |
| Tetramethyl Thiuram Disulfide (TMTD) | 2.0 | — | — | — |
| 4-Morpholinyl-2-benzothiazole disulfide | 1.0 | — | — | — |
| m-phenylene dimaleimide | 2.0 | — | — | — |
| Sulfur | — | 3.6 | 2.0 | 0.80 |
| N—t-butyl-2-benzothiazole-sulfenamide | — | 0.72 | 0.40 | 0.16 |
| Tetramethyl thiuram monosulfide | — | 1.2 | 2.0 | 2.60 |
| NOVOR 924 urethane crosslinker | — | 1.05 | 5.4 | 8.40 |
| Calcium oxide | — | 1.0 | 2.5 | 4.00 |

R-1597 - Sulfur cured; 2 phr amine antioxidant
R-1656 Urethane cured (10/90) urethane/sulfur, no antioxidant
R-1655 Urethane cured (50/50) urethane/sulfur, no antioxidant
R-1601 Urethane cured (80/20) urethane/sulfur, no antioxidant Master batches for the experimental compounds were mixed in a Banbury Mixer (Model BR) using a standard six minute mixing schedule (ASTM D15-72). The cure ingredients were added to the masterbatch on a cooled 200×400 mm two roll mill. Cure characteristics were determined using an oscillating disk rheometer. The compounds were molded and cured to 95% optimum cure at 160° C.

ASTM test sheets (150×150×2 mm) were molded according to ASTM D 3182. Specimens were cut from the cured test sheets using a die and punch press.

TEST METHODS

Tensile strength and elongation at break were determined on unaged and heat aged samples. Testing was done at room temperature according to ASTM D 412 (die C) at 500 mm per minute using an electromechanical tester. Heat aging of the samples was done according to ASTM D 573-67 for 70 hours at 125° C. or 150° C.

Hardness of the vulcanizates was measured according to ASTM D 2240 using a Shore A durometer. A ten second relaxation was allowed before the final reading.

Sour gasoline aging was performed at 40° C. using twelve inch long glass tubes and a constant temperature aluminum block. Dumbbell specimens (ASTM D412-die C) were suspended in the tubes containing 200 ml sour gasoline. The tubes were fitted with water cooled reflux condensors to reduce volume loss from evaporation. Each tube contained nine dumbbell specimens. The test fluid was replenished with freshly made sour gasoline twice weekly (every 3-4 days), and physical properties (tensile, elongation, and hardness) were measured every seven days on three of the specimens. The specimens were removed from the fluid and tested according to ASTM D 471-77.

The test fluid was Indolene HO-III, American Oil Company, which was soured to a peroxide number of 60 (meg of hydroperoxide per 1000 ml of test fluid) by adding 70% t-butyl hydroperoxide. A soluble copper salt was added to the fuel to bring the copper ion concentration to $1.6 \times 10^{-7}$ moles/liter. This represents the upper level of copper reported to be present in commercially available fuels. It is added to the fuel to accelerate the test and attempt to duplicate conditions existing in fuel injection systems.

Permeability to fuel of the cured rubber samples was determined as follows: Thirty ml of the test fluid (Indolene HO III) was placed in an aluminum chamber 39 mm in diameter and 46 mm in depth. A disk cut from the cured ASTM test sheet 58 mm in diameter closed the chamber and was held in place by a brass ring secured by a threaded locking ring. The apparatus is illustrated in FIG. 8.

The assembled apparatus was weighed before inverting and every two hours after standing inverted until four weighings had been made (8 hours total inversion). The apparatus was then kept inverted and weighed to 0.01 g every 24 hours for 21 days. A box with the top and bottom removed was placed around the test containers so that air currents over the rubber disk diaphragm would be eliminated.

The following Table C lists the physical properties of the nitrile elastomers of Table B before and after sour gasoline testing.

TABLE C

| Urethane/Sulfur | 0/100 (R-1597) | 10/90 (R-1656) | 50/50 (R-1655) | 80/20 (R-1601) |
|---|---|---|---|---|
| Originals (unaged) | | | | |
| Tensile (MPa) | 9.2 | 6.0 | 8.0 | 8.1 |
| Elongate (%) | 520 | 170 | 265 | 335 |
| Hardness (Shore A) | 62 | 65 | 62 | 62 |
| 7 Days Sour Gasoline | | | | |
| Tensile | 6.7 (−27.2) | 6.7 (+11.7) | 7.1 (−11.2) | 8.7 (+7.4) |
| Elongation | 310 (−40.4) | 160 (−5.9) | 220 (−17.0) | 325 (−3.0) |
| Hardness | 60 (−2) | 72 (+7) | 67 (+5) | 64 (+2) |
| 14 Days | | | | |
| Tensile | 5.2 (−43.5) | 7.6 (+26.7) | 7.4 (−7.5) | 8.9 (+9.9) |
| Elongation | 225 (−56.7) | 155 (−8.8) | 195 (−26.4) | 320 (−4.5) |
| Hardness | 65 (+3) | 75 (+10) | 70 (+8) | 65 (+3) |
| 21 Days | | | | |
| Tensile | 4.1 (−55.4) | 8.0 (+33.3) | 8.0 (−) | 8.8 (+8.6) |
| Elongation | 170 (−67.3) | 135 (−20.6) | 190 (−28.3) | 300 (−10.4) |
| Hardness | 67 (+5) | 77 (+12) | 72 (+10) | 67 (+5) |

Numbers in parenthesis are the % change from the original for tensile strength and elongation at break and the point change for hardness.

R1655 (50/50 urethane/sulfur) and R1656 (10/90 urethane/sulfur) show improvement over R1597 (sulfur), however the high crosslink density of '55 and '56 (due to sulfur) contributed to their performance.

Figure 9:
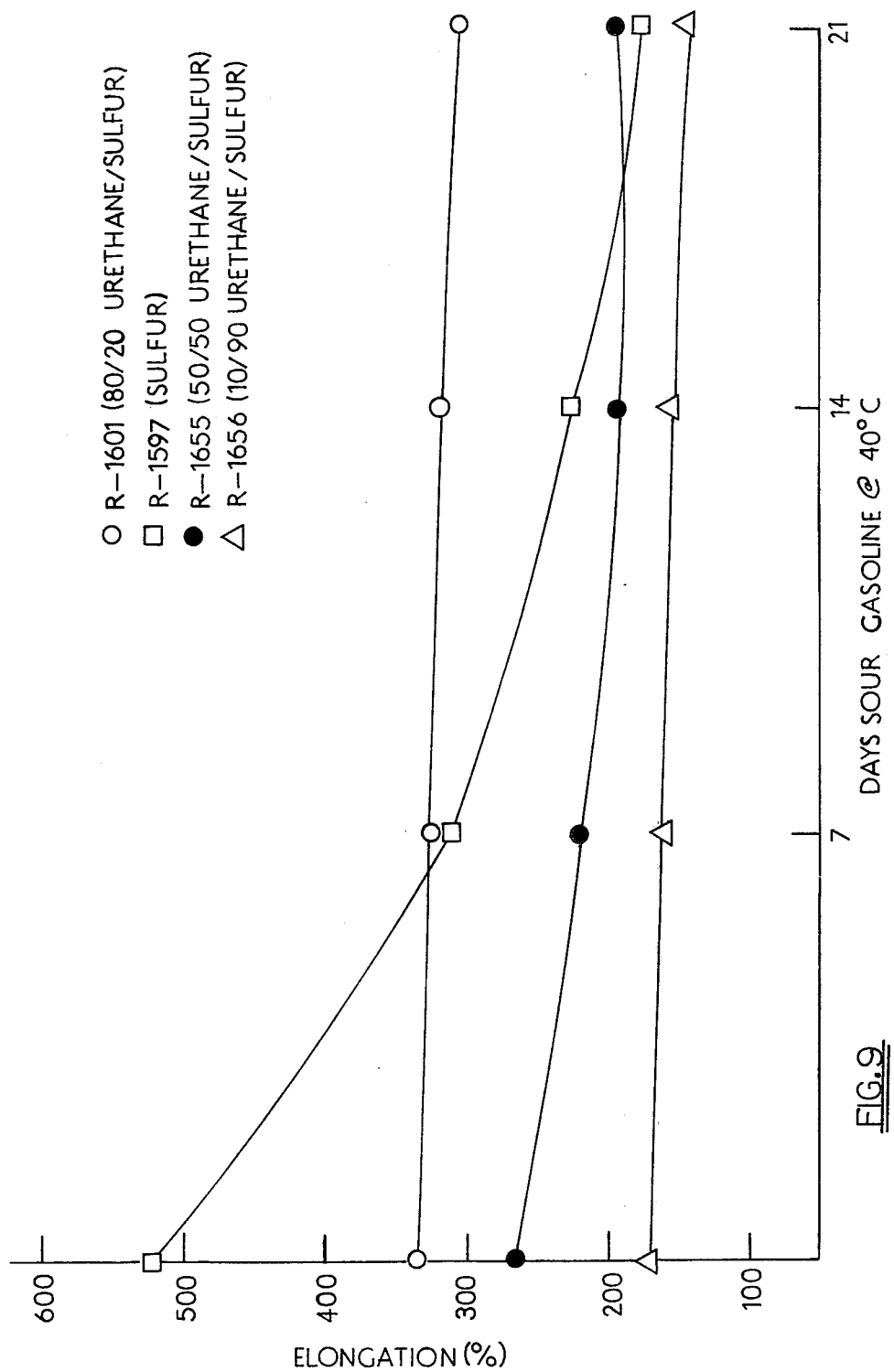
FIG. 9 graphically illustrates the effect of the urethane/sulfur ratio of the nitrile cure system on elongation to break after sour gasoline aging.

FIG. 9 graphically illustrates elongation behavior of the above nitriles after sour gasoline aging and clearly shows that sulfur cured nitriles are inferior to urethane cured nitriles with respect to sour gasoline resistance.

The following Table D discloses additional formulations of the elastomeric test compounds referenced in the figures which were not disclosed in Table B. (Composition formulations are given in parts by weight).

TABLE D

ADDITIONAL FORMULATIONS OF TEST COMPOUNDS

| | R-1550 | R-1556 | R-1594 | R-1595 | R-1598 | R-1600 | R-1601 | R-1609 |
|---|---|---|---|---|---|---|---|---|
| Krynac 38.50 | 100 | — | 100 | — | 100 | — | 100 | — |
| Chemigum HR 365 | — | 100 | — | 100 | — | 100 | — | — |
| Chemigum HR 765 | — | — | — | — | — | — | — | 100 |
| N-990 Carbon black | 30 | 30 | 30 | 30 | 30 | 30 | 30 | 30 |
| Precipitated hydrated silica | 60 | 80 | 60 | 60 | 80 | 80 | 80 | 80 |
| Zinc oxide | 5 | — | 5 | 5 | 5 | 5 | 5 | 5 |
| Cadmium oxide | — | 5 | — | — | — | — | — | — |
| Stearic acid | 0.5 | 0.5 | 1 | 1 | 0.5 | 0.5 | 0.5 | 0.5 |
| Magnesium oxide | 10 | 10 | 10 | 10 | 10 | 10 | 10 | 10 |
| Substituted diphenylamine antioxidant | 2 | — | 2 | — | 2 | — | — | — |
| Phthalic anhydride | 2 | 2 | — | — | — | — | — | — |
| TE-80 process aid | 2 | — | — | — | — | — | — | — |
| Paraplex G-40 polyester plasticizer | 10 | — | 10 | 10 | 10 | 10 | 10 | 10 |
| Pentaerythritol ester plasticizer | 15 | — | 15 | 15 | — | — | — | — |
| Struktol WB-312 process aid | — | 3 | 3 | 3 | 3 | 3 | 3 | 3 |
| Struktol WB-300 polyester plasticizer | — | 25 | — | — | 25 | 25 | 25 | 25 |
| Spider sulfur | 0.4 | 0.4 | — | — | — | — | — | — |
| Tetramethyl thiuram disulfide | 2.0 | 2.0 | — | — | — | — | — | — |
| 4-Morpholinyl-2-benzothiazole disulfide | 1.0 | 1.0 | — | — | — | — | — | — |
| m-Phenylenedimaleimide | 2.0 | 2.0 | — | — | — | — | — | — |
| Sulfur | — | — | 0.80 | 0.80 | 0.80 | 0.80 | 0.80 | 0.80 |

TABLE D-continued
ADDITIONAL FORMULATIONS OF TEST COMPOUNDS

|  | R-1550 | R-1556 | R-1594 | R-1595 | R-1598 | R-1600 | R-1601 | R-1609 |
|---|---|---|---|---|---|---|---|---|
| N—t-Butyl-2-benzothiazolesulfenamide | — | — | 0.16 | 0.16 | 0.16 | 0.16 | 0.16 | 0.16 |
| Tetramethyl-thiuram monosulfide | — | — | 2.60 | 2.60 | 2.60 | 2.60 | 2.60 | 2.60 |
| NOVOR 924 (urethane curative) | — | — | 8.40 | 8.40 | 8.40 | 8.40 | 8.40 | 8.40 |
| Calcium oxide | — | — | 4.0 | 4.0 | 4.0 | 4.0 | 4.0 | 4.0 |

Hi Sil 215 is the tradename for precipitated hydrated silica from Pittsburg Plate and Glass Inc. Naugard 445 is the tradename for a substituted diphenylamine antioxidant available from Uniroyal Chemical Company. Te-80 is a processing aid available from Technical Processing Incorporated. Hercoflex 600 is a pentaerythritol ester plasticizer from Hercules Incorporated. Struktol WB-312 is a process aid and Struktol WB-300 is a polyester plasticizer, both are available from Struktol Company. Paraplex G-40 is a polyester plasticizer available from Rohm & Haas. Spider Sulfur is a free flowing, odorless, nontoxic light yellow powder available from C. P. Hall.

In view of this disclosure, many modifications of this invention will be apparent to those skilled in the art. It is intended that all such modifications which fall within the true scope of the invention will be included within the terms of the appended claims.

We claim:

1. A method for using a urethane cured nitrile vulcanizate in a system wherein a vulcanizate is contacted by sour hydrocarbon fuel employed in said system which comprises:

forming an article of desired configuration useful in said system of a vulcanizate the composition of which consists essentially of the reaction product of (i) 100 parts by weight of an acrylonitrile butadiene copolymer and (ii) a curative comprising 1-10 parts by weight of a urethane curing agent, wherein said urethane curing agent is the reaction product of a nitrosophenol and a diisocyanate; and placing said article in said system wherein at least part of the time said system is in operation said article is contacted by said sour hydrocarbon fuel.

2. A method for using urethane cured nitrile vulcanizate according to claim 1, wherein said curative further comprises a sulfur curing agent, the ratio of said urethane to said sulfur being about 1:9 to 9:1.

3. A method for using a urethane cured nitrile vulcanizate according to claim 2, wherein said ratio is between about 4:1 to 1:1.

4. A method for using a urethane cured nitrile vulcanizate according to claim 1, wherein said composition further comprises particulate selected from the group consisting essentially of (i) carbon black, (ii) silica, and (iii) a mixture of (i) and (ii).

5. A method according to claim 4, wherein said carbon black has a particle size of between about 250 and about 350 millimicrons.

* * * * *